(12) United States Patent
Lambert et al.

(10) Patent No.: US 8,466,438 B2
(45) Date of Patent: Jun. 18, 2013

(54) SYSTEM AND METHOD OF USING FLUORESCENT MATERIAL TO DISPLAY INFORMATION ON A VEHICLE WINDOW

(75) Inventors: David K. Lambert, Sterling Heights, MI (US); Xinhua (Sam) He, Zionsville, IN (US); Michel F. Sultan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 462 days.

(21) Appl. No.: 12/841,422

(22) Filed: Jul. 22, 2010

(65) Prior Publication Data

US 2012/0020102 A1 Jan. 26, 2012

(51) Int. Cl.
*G01N 21/64* (2006.01)

(52) U.S. Cl.
USPC .......................... 250/461.1; 353/12; 359/630

(58) Field of Classification Search
USPC .......... 250/458.1, 459.1, 461.1, 483.1; 345/7; 348/744; 353/13; 359/630
See application file for complete search history.

(56) References Cited

U.S. PATENT DOCUMENTS

| | | | |
|---|---|---|---|
| 6,607,287 B1 | 8/2003 | Ayala, Jr. et al. |
| 6,900,916 B2 | 5/2005 | Okazake et al. |
| 6,979,499 B2 | 12/2005 | Walck et al. |
| 6,986,581 B2 | 1/2006 | Sun et al. |
| 7,090,355 B2 | 8/2006 | Liu et al. |
| 7,213,923 B2 | 5/2007 | Liu et al. |
| 7,452,082 B2 | 11/2008 | Sun et al. |
| 2005/0231652 A1 | 10/2005 | Liu et al. |
| 2008/0198335 A1 | 8/2008 | Kawai et al. |

FOREIGN PATENT DOCUMENTS

| | | |
|---|---|---|
| FR | 2929017 | 9/2009 |
| FR | 2929017 A1 * | 9/2009 |

OTHER PUBLICATIONS

European Search Report dated Nov. 8, 2011.
Weihrauch, M., Meloeny, C.C., and Geosch, T.C.; The First Head Up Display Introduced by General Motors, SAE #890288, 1989.
Cheng, et al. "Active Heads-up Display based Speed Compliance Aid for Driver Assistance: A Novel Interface and Comparative Experimental Studies", 2007 IEEE Intelligent Vehicles Symposium, Istanbul, Turkey, Jun. 13-15, 2007; 1-4244-1068-1/07; pp. 594-599.
Liu, et al. "Transparent and stable photoluminescent sol-gel hybrid films by incorporating surface modified ZnO nanocrystals", Sep. 10, 2007 (Revised Feb. 26, 2008); www.sciencedirect.com; Thin Solid Films 516 (2008) pp. 8507-8512.
Doshi, et al. "A Novel Active Heads-Up Display fro Driver Assistance"; IEEE Transactions on Systems, Man, and Cybernetics—Part B: Cybernetics, vol. 39, No. 1, Feb. 2009; pp. 85-93.

* cited by examiner

*Primary Examiner* — Mark R Gaworecki
(74) *Attorney, Agent, or Firm* — Lawrence D. Hazelton

(57) ABSTRACT

A system to selectively display a symbol at a location on a vehicle window. The system includes an arrangement of a fluorescent material at the location, wherein the fluorescent material: a) is sufficiently transparent in the absence of ultraviolet (UV) light, b) fluoresces when illuminated with UV light, c) and has a shape corresponding to the symbol, and a UV light source configured to illuminate the location with UV light to display the symbol. Such a system may use unfocused UV light sources to illuminate the symbol shaped fluorescent material as opposed to focused UV light sources such as UV lasers.

17 Claims, 5 Drawing Sheets

SYSTEM AND METHOD OF USING FLUORESCENT MATERIAL TO DISPLAY INFORMATION ON A VEHICLE WINDOW

TECHNICAL FIELD OF INVENTION

The invention generally relates to displaying information on a vehicle window, and more particularly relates to displaying information on a vehicle window using fluorescent material that is generally transparent and fluoresces when illuminated with ultraviolet (UV) light.

BACKGROUND OF INVENTION

It has been suggested to treat an entire windshield of a vehicle (e.g.—an automobile) with a uniform layer of material that is normally transparent, but fluoresces when it is illuminated with ultraviolet (UV) light, and then project a focused pattern of UV light onto the windshield by using a UV laser to display images on the windshield. The UV laser projects images by altering the direction and intensity of a UV laser beam onto the windshield according to a scanning pattern in order to display both complex indeterminate information, such as a map or other navigation information, and display simple predetermined information such as a symbol indicating that a turn signal is activated. U.S. Pat. No. 6,979,499 issued Dec. 27, 2005 to Walck et al., U.S. Pat. No. 6,986,581 issued Jan. 17, 2006 to Sun et al., and U.S. Pat. No. 7,090,355 issued Aug. 15, 2006 to Liu et al. describe suitable fluorescent materials and application methods, and describe using a UV laser to project images, the entire disclosures of which is hereby incorporated herein by reference. It has been observed that using a UV laser to illuminate such fluorescent material on a windshield may not always provide a sufficiently distinguishable image, such as when bright sunshine is present. Also, when considering providing such a feature on lower priced automobiles, the cost of a UV laser is generally thought to be prohibitive.

SUMMARY OF THE INVENTION

Described herein is a system and method for displaying a predetermined symbol at a location on a vehicle window by providing at the location a symbol shaped pattern of the fluorescent material described above, and then illuminating the location with non-imaging type UV light source to display the symbol. While such a system or method may not be capable of displaying complex indeterminate information such as a map, it does provide a lower cost way to display simple predetermined information on a windshield such as an indication that a turn signal is activated. Such an arrangement having fixed symbols at each given location on the windshield provides a display that is readily understood by a vehicle driver.

In accordance with one embodiment of this invention, a system to selectively display a symbol at a location on a vehicle window is provided. The system includes an arrangement of a fluorescent material, and a UV light source. The arrangement of a fluorescent material is at the location. The fluorescent material a) is sufficiently transparent in the absence of ultraviolet (UV) light, b) fluoresces when illuminated with UV light, c) and has a shape corresponding to the symbol. The UV light source is configured to illuminate the location with UV light to display the symbol.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
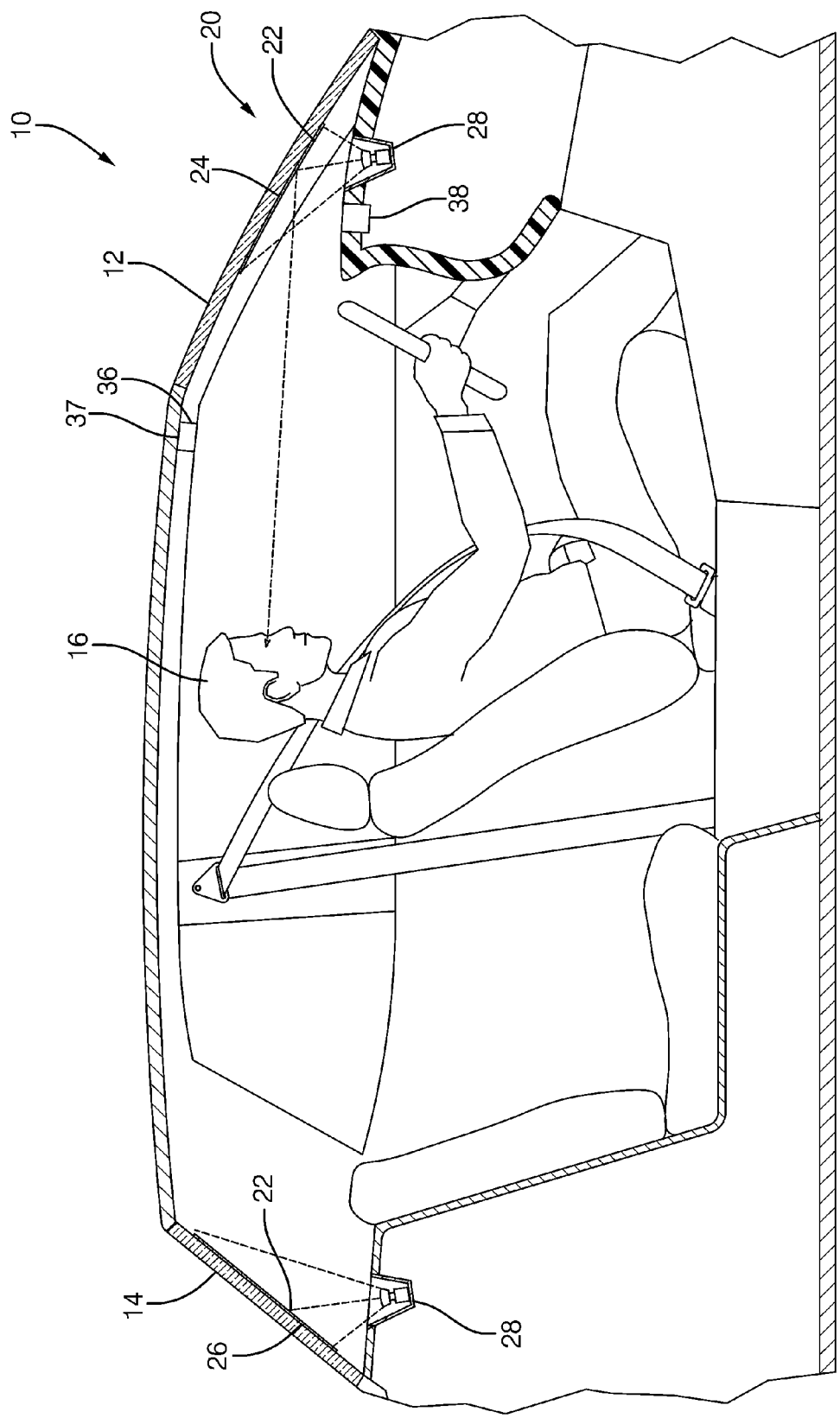
FIG. 1 is a cut away side view of a vehicle equipped with a display system in accordance with one embodiment.

In accordance with an embodiment of a system to selectively display a symbol at a location on a vehicle window, FIG. 1 illustrates a vehicle 10 equipped with a forward view vehicle window or windshield 12, and a rearward view vehicle window or rear window 14 so a vehicle operator 16 is able to see outside of the vehicle 10. The vehicle 10 is also equipped with a display system 20 that includes fluorescent material 22 that may be applied or otherwise arranged at a location 24 on the windshield 12 and/or a location 26 on the rear window 14, and unfocused or non-imaging ultraviolet (UV) light sources 28 configured to illuminate or flood the locations with UV light. As used herein, unfocused light is light that generally illuminates the location with light having relatively uniform intensity over the location. In contrast, an example of a focused light source is an imaging laser that generally varies the direction and/or intensity of a beam of light to project an image. As such, a UV laser is specifically excluded as a type of unfocused UV light source.

In general, the fluorescent material 22 is part of a class of photoluminescent materials that emits visible light in response to being illuminated with ultraviolet (UV) light. The fluorescent material 22 for the display system 20 described herein is configured such that it is in general sufficiently transparent in the absence of ultraviolet (UV) light so that the fluorescent material 22 does not interfere with a vehicle operator 16 seeing through the vehicle window 12 or 14. Federal Motor Vehicle Safety Standard 205 requires that an automobile front windshield have a minimum of 70% average transparency for a defined light source and with a spectral sensitivity that emulates a typical human eye. When the fluorescent material 22 is illuminated with UV light, the fluorescent material 22 fluoresces such that the presence of the fluorescent material 22 is apparent to the vehicle operator 16 and/or others (not shown) outside of the vehicle 10. The fluorescent material is generally arranged to have a shape that corresponds to the symbol to be displayed. Then, when the material is illuminated with an unfocused or non-imaging UV light source, the shape of the symbol may be discerned. It follows that when the location is illuminated, the shape of the symbol is apparent and so information is conveyed to a viewer such as the operator 16.

The UV light source is generally configured to selectively illuminate the location with UV light to selectively display the symbol. The UV light source and the fluorescent material are preferably selected so UV emitted by the light source is efficiently converted to visible light of the desired color. One desirable characteristic for efficient conversion is to select the emission band of the UV source to coincide with an absorption band of the fluorescent material. For example, a method to prepare a transparent coating of ZnO nanocrystals on glass is described in Y. Liu, C. Lu, M. Li, J. Liu, L. Zhang, J. Zhang, and B. Yang, "Transparent and stable photoluminescent sol-gel hybrid films by incorporating surface modified ZnO nanocrystals," Thin Solid Films 516 (2008) 8507. Quantum efficiencies of up to 80% for similar nanoparticles are cited. In this example, the UV absorption edge of the film depends on the size of the nanoparticles, which is adjustable. Many methods to create a graphic image on a glass surface are known to the art, such as: (1) nanoparticles dispersed in a liquid are deposited to form a graphic image with an ink jet printer, (2) fluorescent nanoparticles on a polymer film are transferred to a glass surface to form a graphic image by placing the film in close proximity to the glass surface and selectively heating the polymer film with a laser to transfer the nanoparticles from the polymer film to the glass surface to form to the desired image, and (3) a transparent polymer film with fluorescent material mixed into the polymer is cut into the desired shape by a mechanical punch and attached to the glass surface with an adhesive.

The UV light sources 28 are illustrated as having reflectors, but the reflectors are not required. The reflectors are illustrated only for the purpose of suggesting that the light output by the UV light source is unfocused and generally directed toward some location. As used herein, 'to selectively display a symbol' means that that the symbol is not apparent when display of the symbol is not desired, and the symbol is apparent when display of the symbol is desired. For example, in accordance with one embodiment, if display of the symbol is not desired, then the fluorescent material is not illuminated with UV light and so the symbol is not apparent. Contrariwise, if display of the symbol is desired, then the fluorescent material is illuminated with UV light and so the symbol is apparent.

Figure 2:
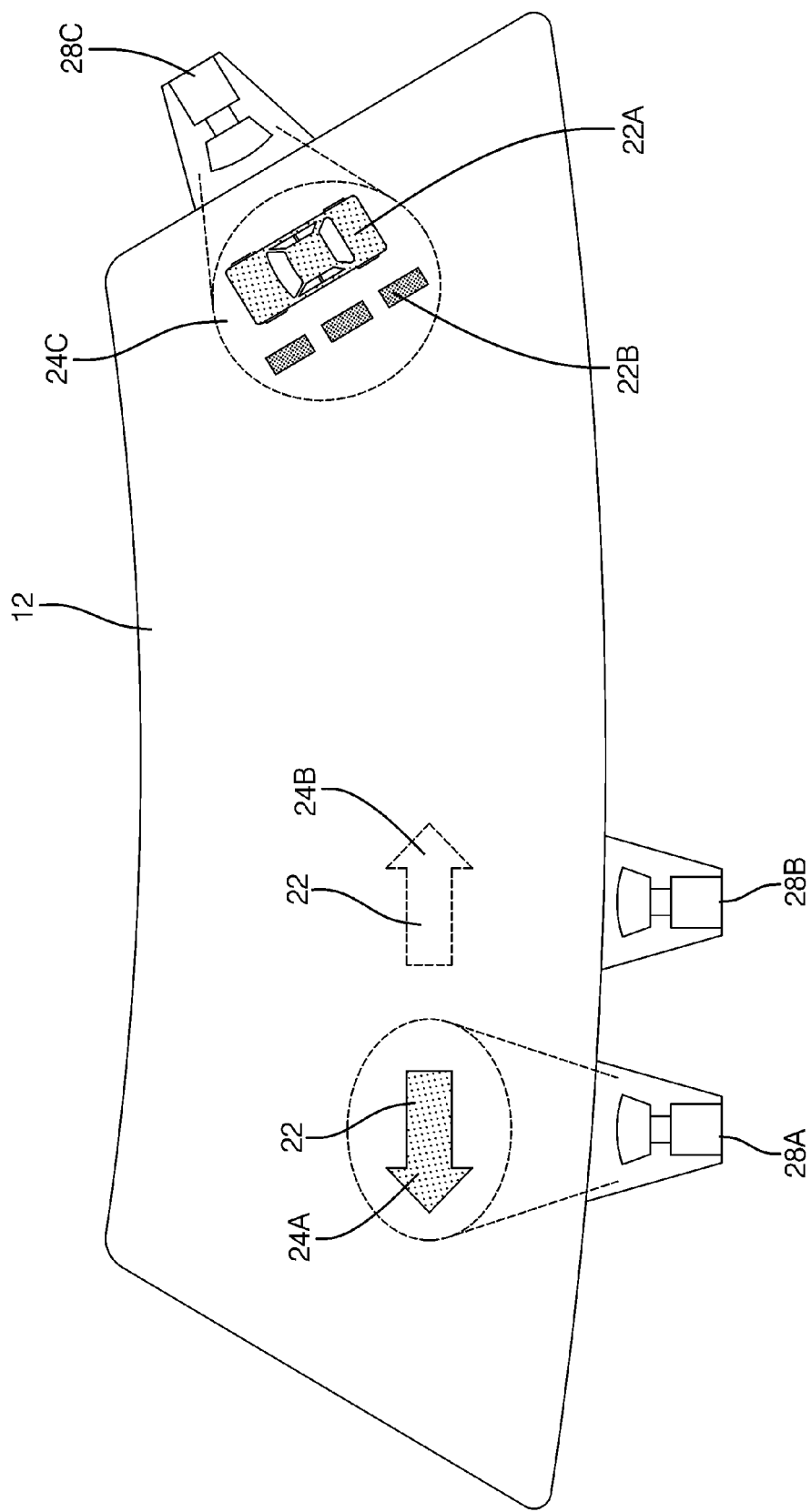
FIG. 2 is a perspective view of a windshield of the vehicle in FIG. 1 in accordance with one embodiment.

FIG. 2 illustrates a non-limiting example of a view that may be seen by the operator 16 operating a vehicle equipped with the display system 20. Fluorescent material 22 is present on or in the windshield 12 at least at locations 24A and 24B. In this example, the fluorescent material 22 has a first shape of a first symbol at location 24A for indicating that the left turn signal is activated, and a second shape of a second symbol at location 24B for indicating that the right turn signal is activated. A UV light source 28A is illustrated as emitting light to illuminate the location 24A so the symbol at the location 24A is generally apparent to the operator 16 and so the symbol is being displayed. Another UV light source 28B is illustrated as not emitting light, and so the second shape at location 24B is generally not apparent to the operator 16 and so the symbol is not being displayed, as indicated by the dotted outline of the second symbol at location 24B. From this example it will be appreciated that the system 20 may include an arrangement of fluorescent material that includes a plurality of symbols each located at a distinct locations, and the UV light source may be configured to selectively illuminate each distinct location with UV light to selectively display none, one, or more of symbols.

In another embodiment, the fluorescent material 22 may include a first material 22A that fluoresces at a first color and a second material 22B that fluoresces at a second color. By cooperatively arranging fluorescent materials having different colors at a location, multicolor symbols can be displayed by arranging the first material 22A and the second material 22B such that distinct portions of the symbol fluoresce with different colors. By way of a non-limiting example, FIG. 2 illustrates at location 24C a two color symbol for indicating that another vehicle is present in a traffic lane adjacent to the vehicle 10. The location 24C may be selectively illuminated by UV light source 28C when display of the symbol at location 24C is desired.

Figure 3:
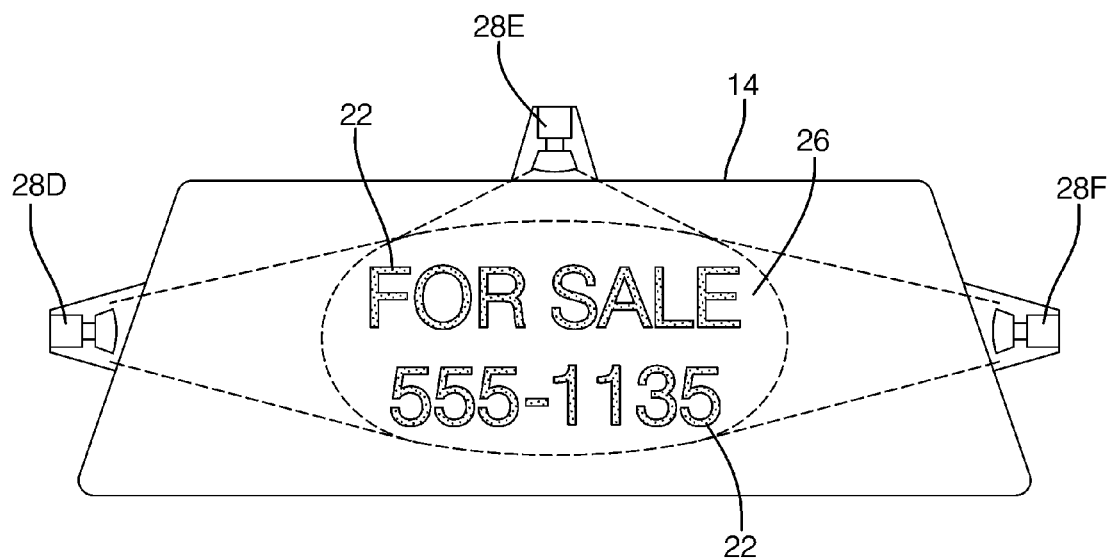
FIG. 3 is a perspective view of a rear window of the vehicle in FIG. 1 in accordance with one embodiment.

In another embodiment, the rear window 14 has fluorescent material arranged at location 26. FIG. 3 illustrates a non-limiting example of a view of the rear window that may be seen by a person viewing the rear window from outside the vehicle 10. The fluorescent material 22 is arranged at location 26 and in this example may be illuminated by more than one UV light source such as UV light sources 28D, 28E, and 28F. The fluorescent material may be applied to the inside or outside of the rear window 14, and the UV lights 28D-F may be positioned accordingly so as to illuminate the symbols at location 26 so that they are apparent to the operator 16 and/or others outside the vehicle (not shown). Such a display of information may be useful for marketing the vehicle 10 as suggested by the content illustrated, or may be an artistic type symbol that is displayed for reasons of decorating the vehicle 10.

In one embodiment, the UV light sources 28A-F may include UV light emitting diodes (LED) for generating UV light. A specific non-limiting example of such a UV LED is Nichia LED with part number NCSU033B, which typically emits 325 milli-Watts (mW) of power with a peak wavelength of 365 nm. UV LEDs with longer wavelength and lower power are also available from Nichia. As noted above, the emission wavelength is preferably chosen to match the absorption wavelength of the fluorescent material. In general, visible intensity of the fluorescent material increases with incident UV power. UV LEDs are inexpensive, durable alternatives to fluorescent style UV light sources, also known as black-lights. UV LEDs are also readily powered by an automobile electrical system. In general, the UV light sources are configured to project UV light in a fixed direction. However, it will be appreciated that the UV light sources 28A-F may include a means to change the general direction of the UV light such as a mechanically positioned minor, or a shutter system that selectively blocks a portion of the light emitted by a UV light source toward a location.

Figure 4:
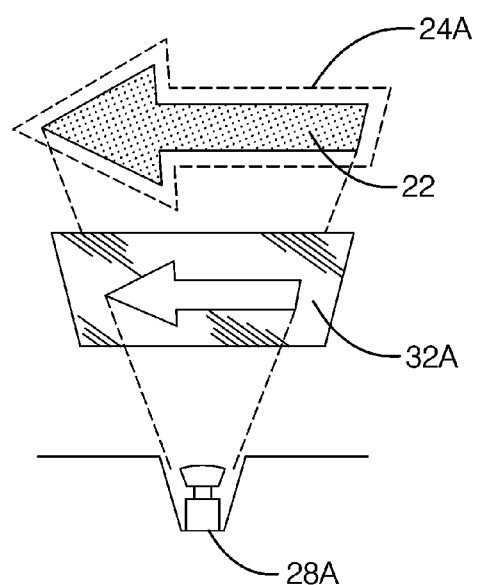
FIG. 4 is a perspective view of a portion of the display system in FIG. 1 in accordance with one embodiment.

FIG. 4 illustrates an alternate embodiment of the arrangement of the light source 28A and the fluorescent material 22 at the location 24A that includes a silhouette 32A defining an opening having an opening shape corresponding to the shape of the symbol at location 24A. By including the silhouette 32A, the area of location 24A illuminated by the light source 28A can be better defined so that symbols can be placed closer together and avoid part of one symbol being inadvertently illuminated by UV light intended for an adjacent location having another symbol.

Figure 5:
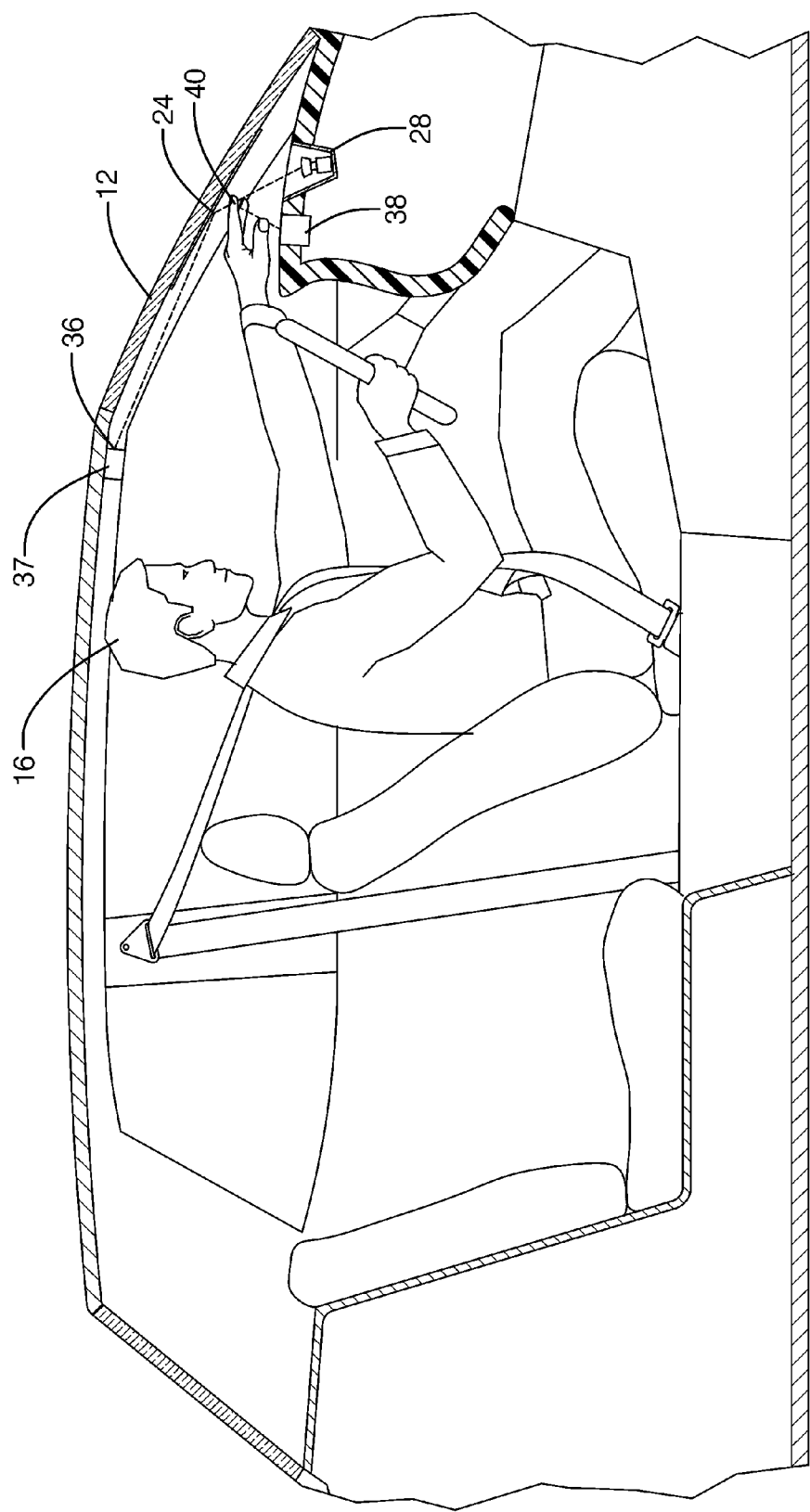
FIG. 5 is a cut away side view of the vehicle equipped with the display system in FIG. 1 in accordance with one embodiment.

Referring again to FIG. 1, the display system 20 may include a detector 36 and/or 38 arranged to detect if an object (not shown) is obstructing the UV light source. FIG. 5 illustrates a more detailed view of the region about the windshield 12. In this exemplary illustration, a hand 40 of the operator 16 is obstructing light from the UV light source from reaching the location 24. In one non-limiting example, the detector 36 may be positioned to detect UV light reflected by the windshield 12. Detector 36 may be configured to detect UV light reflected by the windshield, or may be configured to detect visible light arising from illuminating the fluorescent material with UV light. In another embodiment the detector 38 is positioned to detect UV light reflected by the hand 40. Furthermore, the UV light source can be modulated so detector 36 or 38 receives UV light having an expected modulation pattern. Alternatively, the detector 36 may be replaced by a reflector 37 that reflects light from the windshield back to the detector 38. The reflector 37 may be formed of retroreflective material such as is used on traffic signs. In another embodiment, the detectors 36 and/or 38 are configured to detect visible light emitted by the windshield in response to the incident UV light. Alternatively, the detector 38 may be an ultrasonic type transceiver comprising an ultrasonic source and ultrasonic detector, or an infrared transceiver comprising an infrared source and an infrared detector that detects the presence of the hand 40, or any other object. These types of transceivers do not rely on the reflection of UV light. The display system 20 may be further configured to turn the UV light source 28 off when an object between the UV light source 28 and the location 24 is detected. It may be advantageous to turn off the light source to avoid heat build-up or prevent the object from being exposed to UV light. Additionally, a means to alert the driver that the UV illumination system is obstructed may be provided to alert the operator 16 that the display system 20 may not be able to provide information.

Figure 6:
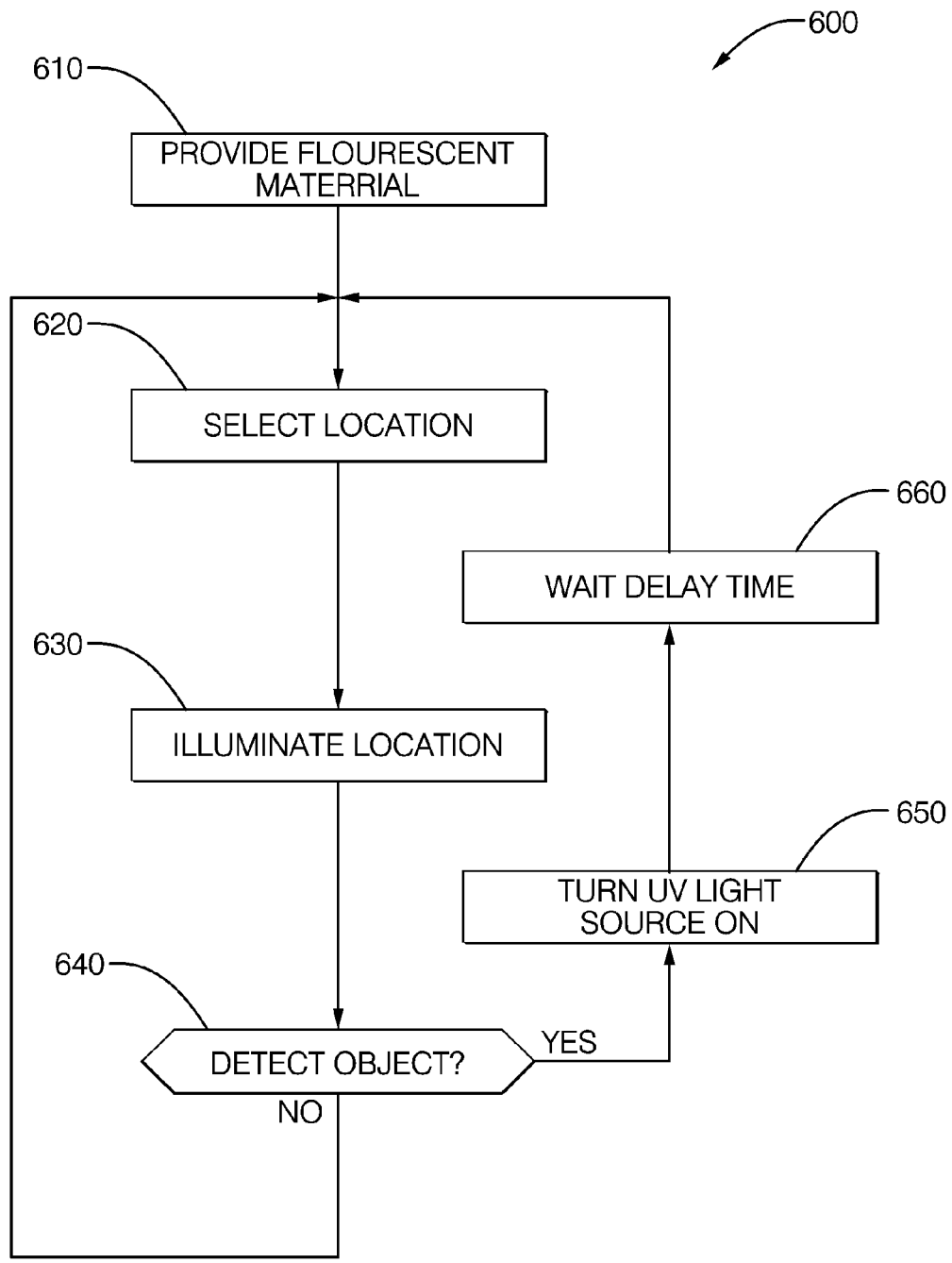
FIG. 6 is a flow chart of a method practiced by the display system in FIG. 1 in accordance with one embodiment.

FIG. 6 illustrates a method 600 of selectively displaying a symbol at a location on a vehicle window. At step 610, PROVIDE FLUORESCENT MATERIAL, fluorescent material 22 is applied to a vehicle window at one or more locations (24A-C or 26), either before or after the window is installed into the vehicle 10. In one embodiment, the fluorescent material 22 may be in the form of portions of clear tape containing fluorescent material and cut to a shape that corresponds to the desired symbol shape. Alternately, the fluorescent material 22 may comprise layer of clear material having symbol shaped regions of fluorescent material. At step 620, SELECT LOCATION, one or more locations are selected to be illuminated by one or more UV light sources (28A-F) so the desired one or more symbols at the one or more locations can be displayed. This selection step may be based on, for example, a turn signal being activated, or a side view radar system detecting another vehicle in a traffic land adjacent the vehicle 10. At step 630, ILLUMINATE LOCATION, none, or one, or more UV light sources (28A-F) selected are activated to illuminate the symbols desired at the one or more locations selected.

At step 640, DETECT OBJECT, the detectors 36 and/or 38 are monitored to see if an object is detected. If NO, that is no object is detected, the routine 600 returns to step 620. As such, if there has been no change in the symbols desired to be displayed, the routine continues to illuminate the same previously selected locations. However, if the desired symbols to be displayed has changed, then the UV light sources 28A-F are turned on or off in accordance with the desired symbols to be displayed. If YES, that is an object is detected, then the routine 600 proceeds to step 650, TURN UV LIGHT SOURCE OFF, where the UV light source being obstructed is turned off. It may be desirable for the UV light source to remain off until the object is removed. Also, an indication to the operator 16 that the UV light source is blocked may be provided. For example, an indicator light may be illuminated, or an alarm may be sounded.

If the detectors 36 and/or 38 are ultrasonic or infrared type detectors, the step 660, WAIT DELAY TIME, may be replaced by a step that halts the process 600 until the object is not detected. However, since some detectors rely on the UV light source being on to detect that it is blocked a simple technique is to turn the UV light source off for a period of time, and then momentarily turn the UV light source on to determine if the UV light source is still blocked. This may be accomplished by executing step 660, WAIT DELAY TIME, so that after a predetermined delay time passes, the system 20 will activate one or more UV light sources to determine if the object is still present.

Accordingly, a system 20 to selectively display a symbol at a location on a vehicle window is provided. By arranging one or more symbol shaped regions of fluorescent material that are relatively clear when UV light is not present, but are detectable by a vehicle operator or other persons when illuminated by UV light, inexpensive UV light sources that are not sources of focused light may be used to illuminate and display the symbol. Also, the system may include detectors to determine if a UV light source is blocked, and turn the UV light source off until the blockage is removed. Moreover, given a driver's limited cognitive capacity to simultaneously process multiple sources of information, only a small portion of the capability of a fully reconfigurable windshield display for the driver can be utilized in a moving vehicle. Since the symbols and their respective locations on the windshield become familiar to the driver, they can be understood in less time and with less cognitive effort. Displaying only one symbol at a given location helps to clarify the driver interface.

While this invention has been described in terms of the preferred embodiments thereof, it is not intended to be so limited, but rather only to the extent set forth in the claims that follow.

We claim:

1. A system to selectively display a symbol at a location on a vehicle window, said system comprising:
    an arrangement of a fluorescent material within the location, wherein the fluorescent material: a) is sufficiently transparent in the absence of ultraviolet (UV) light to not interfere with seeing through the vehicle window, b) fluoresces when illuminated with UV light, c) and has a shape configured to define the shape of the symbol; and
    a UV light source characterized as unfocused and configured to illuminate the location with uniform intensity UV light to display the symbol within the location.

2. The system in accordance with claim 1, wherein the shape of the symbol is such that information is conveyed to a viewer of the symbol when the location is illuminated.

3. The system in accordance with claim 1, wherein the arrangement comprises a plurality of symbols each located at a distinct location, and the UV light source is configured to illuminate each distinct location with UV light to selectively display each symbol.

4. The system in accordance with claim 1, wherein the fluorescent material includes a first material that fluoresces at a first color and a second material that fluoresces at a second color, and the first material and the second material are arranged such that distinct portions of the symbol fluoresce with different colors.

5. The system in accordance with claim 1, wherein the UV light source comprises a silhouette defining an opening having an opening shape corresponding to the shape of the symbol.

6. The system in accordance with claim 1, wherein the system further comprises a detector arranged to detect if an object is obstructing the UV light source.

7. The system in accordance with claim 6, wherein the system is further configured to turn the UV light source off when the object is detected.

8. The system in accordance with claim 6, wherein the system is further configured to provide an indication when the object is detected.

9. The system in accordance with claim 6, wherein the detector is a UV detector arranged to detect UV light reflected by the object.

10. The system in accordance with claim 6, wherein the detector is a UV detector arranged to detect UV light reflected by the vehicle window.

11. The system in accordance with claim 6, wherein the detector is a light detector arranged to detect light arising in response to the fluorescent material being illuminated by the UV light source.

12. The system in accordance with claim 6, wherein the UV source is modulated with a modulation pattern, and the detector is configured to detect the modulation pattern.

13. The system in accordance with claim 6, wherein an infrared source and detector are used to detect an object in the path of the UV light.

14. The system in accordance with claim 6, wherein an ultrasonic source and detector are used to detect an object in the path of the UV light.

15. A method of selectively displaying a symbol within a location on a vehicle window, said method comprising the steps of:

providing a fluorescent material at the location, wherein the fluorescent material: a) is sufficiently transparent in the absence of ultraviolet (UV) light to not interfere with seeing through the vehicle window, b) fluoresces when illuminated with UV light, c) and has a shape configured to define the shape of the symbol; and illuminating the location with UV light characterized as unfocused and configured to illuminate the location with uniform intensity UV light to display the symbol within the location.

16. The method in accordance with claim 15, wherein the step of providing includes arranging a plurality of symbols such that each is located at a distinct location, and the step of illuminating includes operating the UV light source effective to selectively display the symbol.

17. The method in accordance with claim 15, wherein the method further comprises the steps of detecting an object between the UV light source and the location, and turning the UV light source off when an object is detected.

\* \* \* \* \*